(12) United States Patent
Ward

(10) Patent No.: US 7,581,610 B2
(45) Date of Patent: Sep. 1, 2009

(54) VEHICLE AND FOUR-TO-THREE WHEEL CONVERSION METHOD

(76) Inventor: Michael S. Ward, 801 Hidden Woods Dr., Keller, TX (US) 76248

( * ) Notice: Subject to any disclaimer, the term of this patent is extended or adjusted under 35 U.S.C. 154(b) by 503 days.

(21) Appl. No.: 11/580,440

(22) Filed: Oct. 13, 2006

(65) Prior Publication Data

US 2008/0087483 A1  Apr. 17, 2008

(51) Int. Cl.
*B62D 61/06* (2006.01)
*B62D 61/12* (2006.01)
(52) U.S. Cl. .................. 180/209; 180/210; 280/124.109
(58) Field of Classification Search ................ 180/209, 180/210, 357, 374, 376; 280/124.109, 124.17, 280/789
See application file for complete search history.

(56) References Cited

U.S. PATENT DOCUMENTS

| | | | | |
|---|---|---|---|---|
| 1,331,492 A | * | 2/1920 | Fisher | ....................... 180/210 |
| 1,545,878 A | * | 7/1925 | Barron | ....................... 280/788 |
| 2,168,147 A | * | 8/1939 | Arehart | ............... 280/124.118 |
| 2,452,124 A | * | 10/1948 | Huston et al. | ............... 177/141 |
| 4,717,164 A | * | 1/1988 | Levavi | ....................... 280/259 |
| 5,088,763 A | * | 2/1992 | Galazin et al. | ............. 280/656 |

* cited by examiner

*Primary Examiner*—Paul N Dickson
*Assistant Examiner*—Laura Freedman
(74) *Attorney, Agent, or Firm*—Mark E. Brown

(57) ABSTRACT

A three-wheel vehicle includes a single rear drive wheel, which is mounted on a suspension subframe located near the rear of the vehicle and extending between rails of the vehicle's chassis. A transfer is also mounted on the suspension subframe and drivingly interconnects the vehicle drivetrain and the rear wheel. A four-wheel to three-wheel vehicle conversion method includes the steps of removing the differential, rear axles and rear wheels of an original drivetrain and replacing them with a subframe mounting a rear wheel and a transfer. The transfer is connected to the original transmission by a drive shaft. The converted vehicle can be certified and licensed based on less stringent governmental regulations than those applicable to comparable four-wheel vehicles.

5 Claims, 15 Drawing Sheets

VEHICLE AND FOUR-TO-THREE WHEEL CONVERSION METHOD

BACKGROUND OF THE INVENTION

1. Field of the Invention

The present invention relates generally to vehicles, and in particular to a three-wheel vehicle, which can be variously configured as a truck and as other vehicle types. A conversion method involves removing the rear wheels and other parts of the original drivetrain of a conventional four-wheel vehicle, such as a truck, and replacing them with a single, rear drive wheel mounted in a subframe mounting a transfer including drivetrain replacement components.

2. Description of the Related Art

Vehicles are manufactured for a wide range of tasks, such as transporting passengers and various types of cargo over varied road and terrain conditions. For example, many vehicle users require trucks with cargo beds and other load-carrying accommodations. Conventional trucks designed for road travel tend to be larger than is necessary for many light duty operations. The U.S. Department of Transportation (DOT) regulations for conventional trucks and other four-wheel vehicles tend to be relatively stringent, covering many aspects of the four-wheel vehicles' construction and performance. However, vehicles with fewer than four wheels, including motorcycles, are classified differently and are subject to less stringent DOT rules. Under the less stringent DOT rules applicable to motorcycles, a three-wheel vehicle could therefore be manufactured and certified as street-legal at a considerable cost savings as compared to conventional four-wheel vehicles.

Therefore, from a regulatory standpoint, there are certain inherent advantages to vehicles with two and three wheels. Additional regulatory advantages exist for vehicles restricted to use off-road and on private property, because they avoid numerous regulations and restrictions associated with use on public roads.

Certain aspects of vehicle operation and maintenance can also benefit from reducing the number of wheels from four to three. For example, efficiency can be improved because tires create rolling resistance and drag. Maintenance and replacement part costs can be somewhat reduced as a consequence of fewer wheels. Converting from four wheels to three can also improve a vehicle's maneuverability and reduce its turning radius.

Heretofore there has not been available a three-wheel vehicle with the advantages and features of the present invention. There has also not been available a method for converting four-wheel vehicles to three-wheel configurations with the advantages and features of the present invention.

SUMMARY OF THE INVENTION

In the practice of an aspect of the present invention, a vehicle is provided with a suspension subframe mounting a single rear wheel, which is connected to a drivetrain and can function as the sole drive wheel for the vehicle. The subframe also mounts a transfer including a gear drive, which is a component of the drivetrain and is coupled to a drive shaft. The gear drive is drivingly connected to a belt drive subassembly, which drives an axle mounting the rear drive wheel. In the practice of a method comprising an aspect of the present invention, a relatively conventional four-wheel vehicle, such as a light truck, is converted to a three-wheel configuration with a rear wheel being adapted for propelling or helping to propel the vehicle via the transfer mounted on the subframe. The subframe and the transfer replace the rear portions of the original drivetrain, including the rear drive axles and the differential.

DETAILED DESCRIPTION OF THE PREFERRED EMBODIMENTS

I. Introduction and Environment

Figure 1:
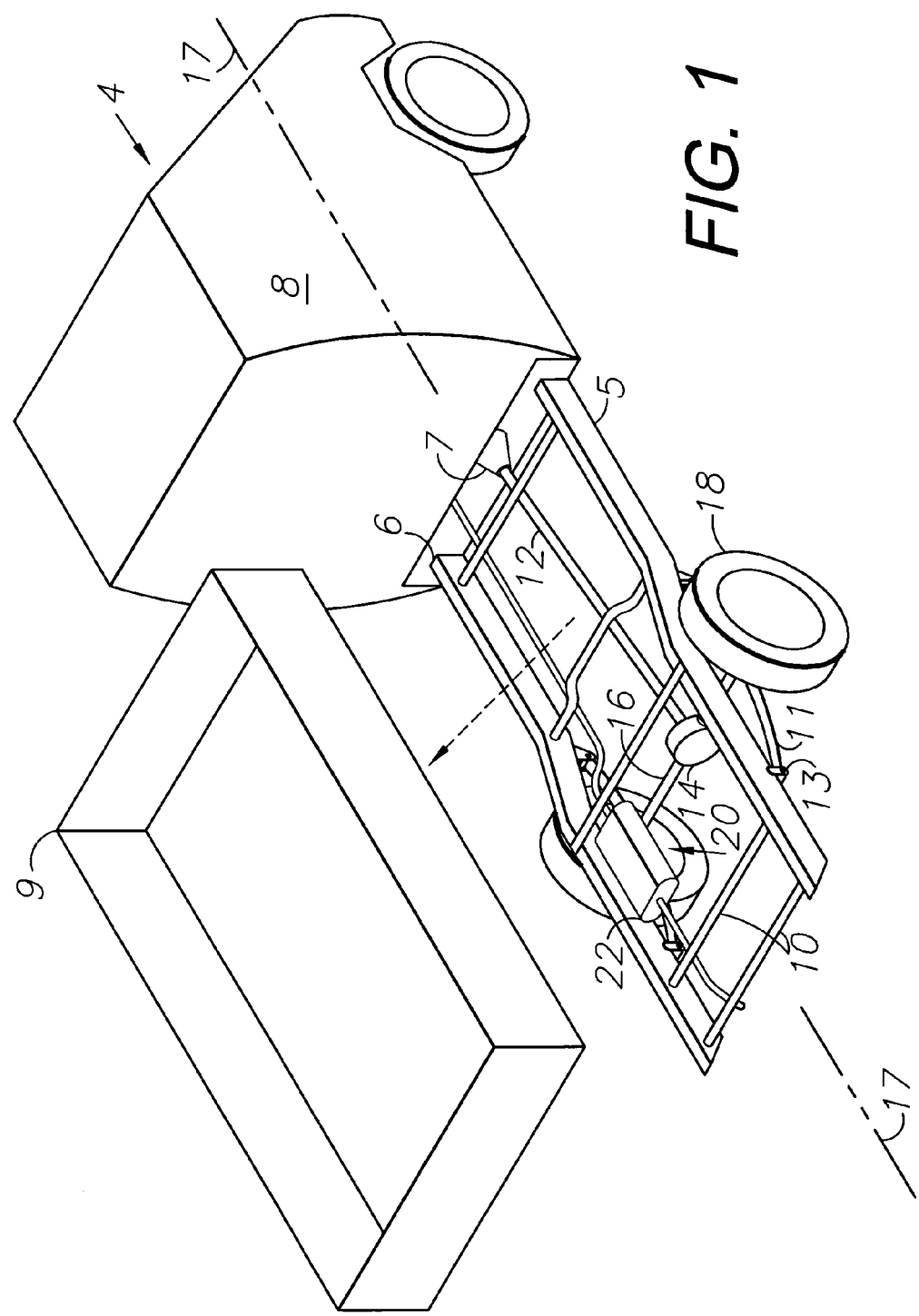
FIG. 1 is an upper right rear quarter view of an original vehicle for use in the conversion method aspect of the present invention, shown with the bed removed.
Figure 2:
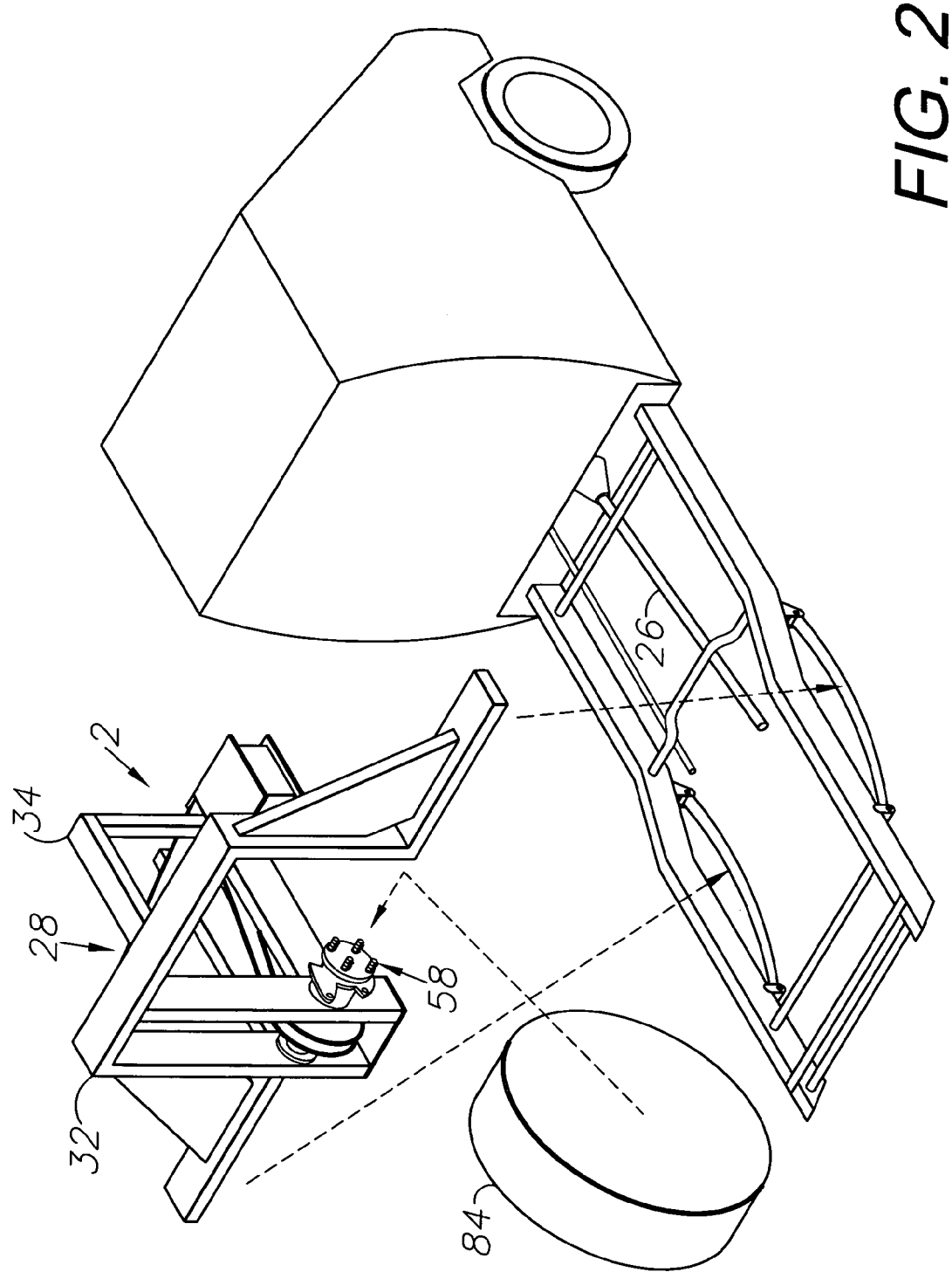
FIG. 2 is an upper right rear quarter view thereof, showing the differential, rear axles and rear wheels removed in preparation for receiving a replacement subframe.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Certain terminology will be used in the following description for convenience in reference only and will not be limiting. Said terminology will include the words specifically mentioned, derivatives thereof and words of similar meaning. For example, "left" and "right" refer to the driver and passenger sides respectively from a forward-facing orientation.

Referring to the drawings in more detail, the reference numeral 2 generally designates an assembly for converting a four-wheel vehicle to a three-wheel vehicle. Without limitation on the generality of useful applications for the conversion assembly 2, it is shown on a vehicle 4 comprising a light truck. The vehicle 4 includes a conventional chassis 5 with a pair of side rails 6 mounting a cab 8 in front and a bed 9 in back. A fuel tank is located generally between the rails 6. A drivetrain 7 is mounted on the chassis 5 and includes an engine (not shown), which can comprise an internal combustion engine of any suitable design for operating on any of a variety of fuels, an electric motor or a hybrid system. The chassis 5 includes multiple, transverse crossbars 10, which extend between and are connected to the rails 6. A longitudinal axis 17 extends fore-and-aft. The vehicle 4 also includes a pair of leaf springs 11 mounted on the undersides of the rails 6 by shackles 13. A conventional rear wheel drive configuration of the vehicle 4 includes a drive shaft 12, which is drivingly coupled to a differential 14 of a rear axle assembly 16, which mounts a pair of rear drive wheels 18. The original rear axle assembly 16 is bolted and clamped to the leaf springs 11 in the conventional manner. An original exhaust system 20 includes a longitudinally-oriented muffler 22.

As shown in FIG. 1, conversion to a three-wheel configuration involves removing the pre-existing bed 9, which exposes most of the vehicle components requiring replacement or modification in the conversion process. With the bed 9 removed, the exhaust system 20 is rerouted to a transverse replacement muffler 24 located at the back of the chassis 5, thereby freeing more space between the chassis rails 6 to accommodate a rear suspension subframe 28 in place of the rear axle assembly 16. The drive shaft 12 is either shortened or replaced with a shorter replacement drive shaft 26. The rear axle assembly 16 is disconnected from the leaf springs 11. Other connecting elements, such as hydraulic brake lines, parking/emergency brake cables, etc., are also disconnected from the rear axle assembly 16 prior to its removal.

II. Subframe 28

Figure 3:
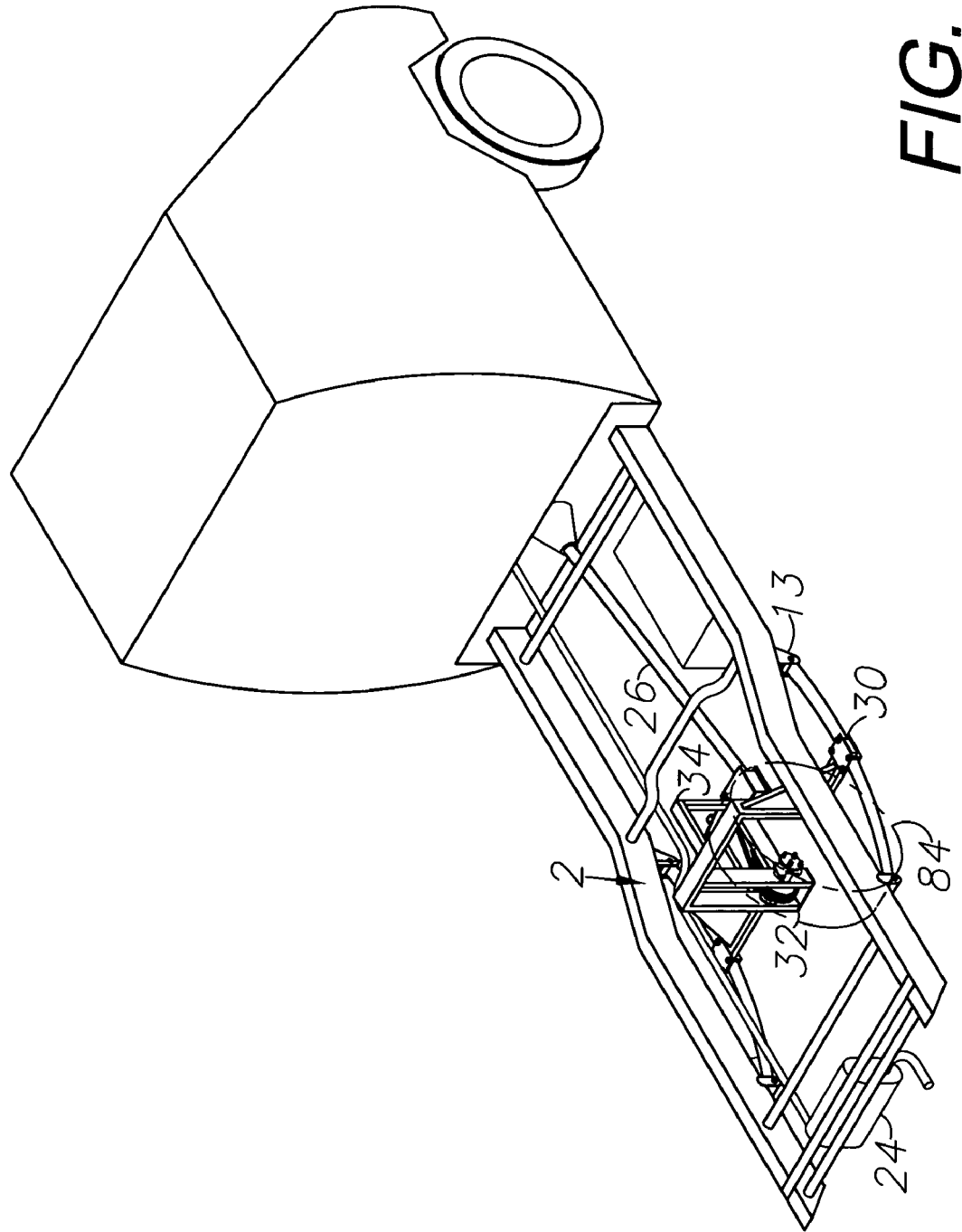
FIG. 3 is an upper right rear quarter view thereof, showing the replacement subframe in place.
Figure 4:
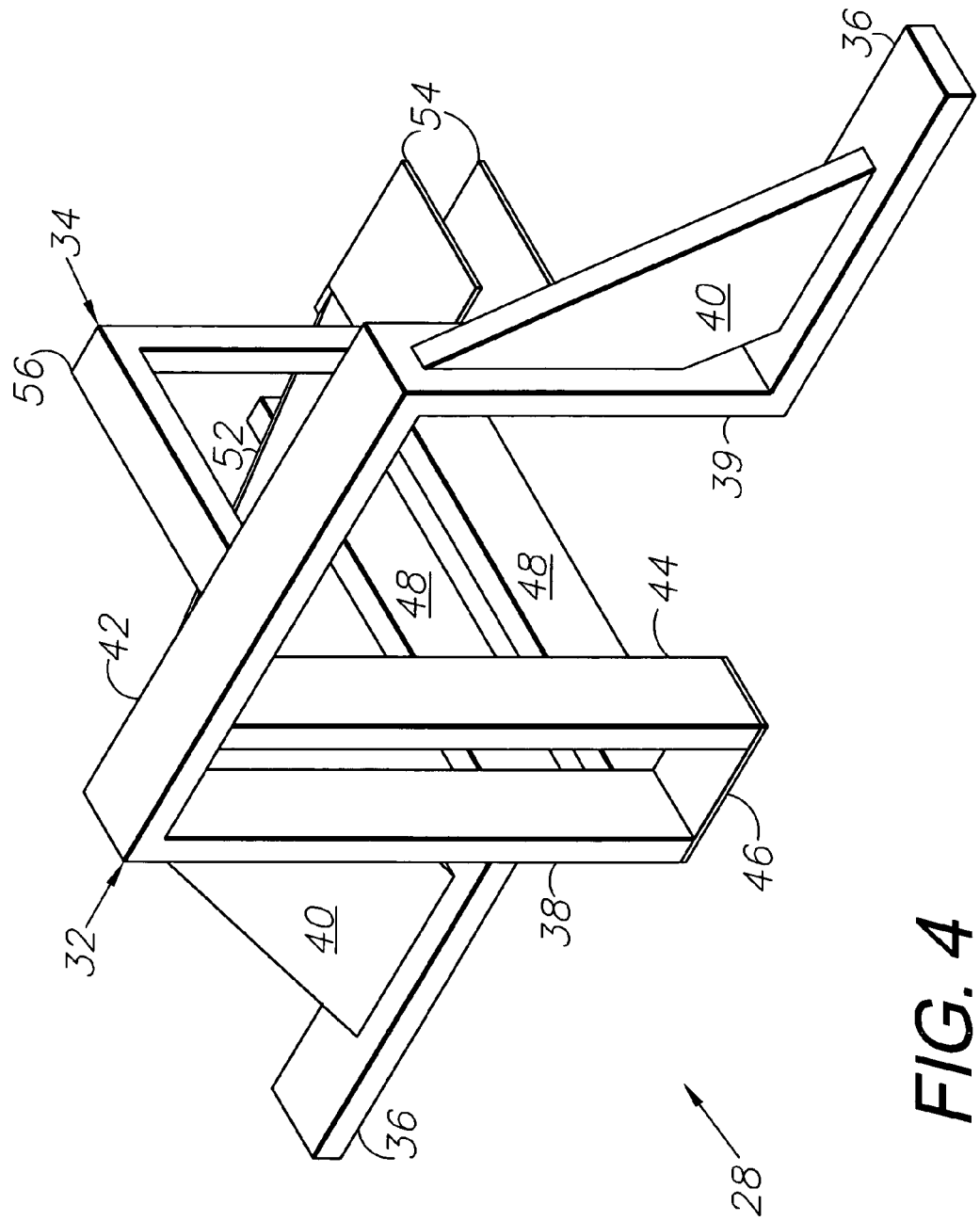
FIG. 4 is an enlarged, upper, right rear quarter view of the subframe.
Figure 5:
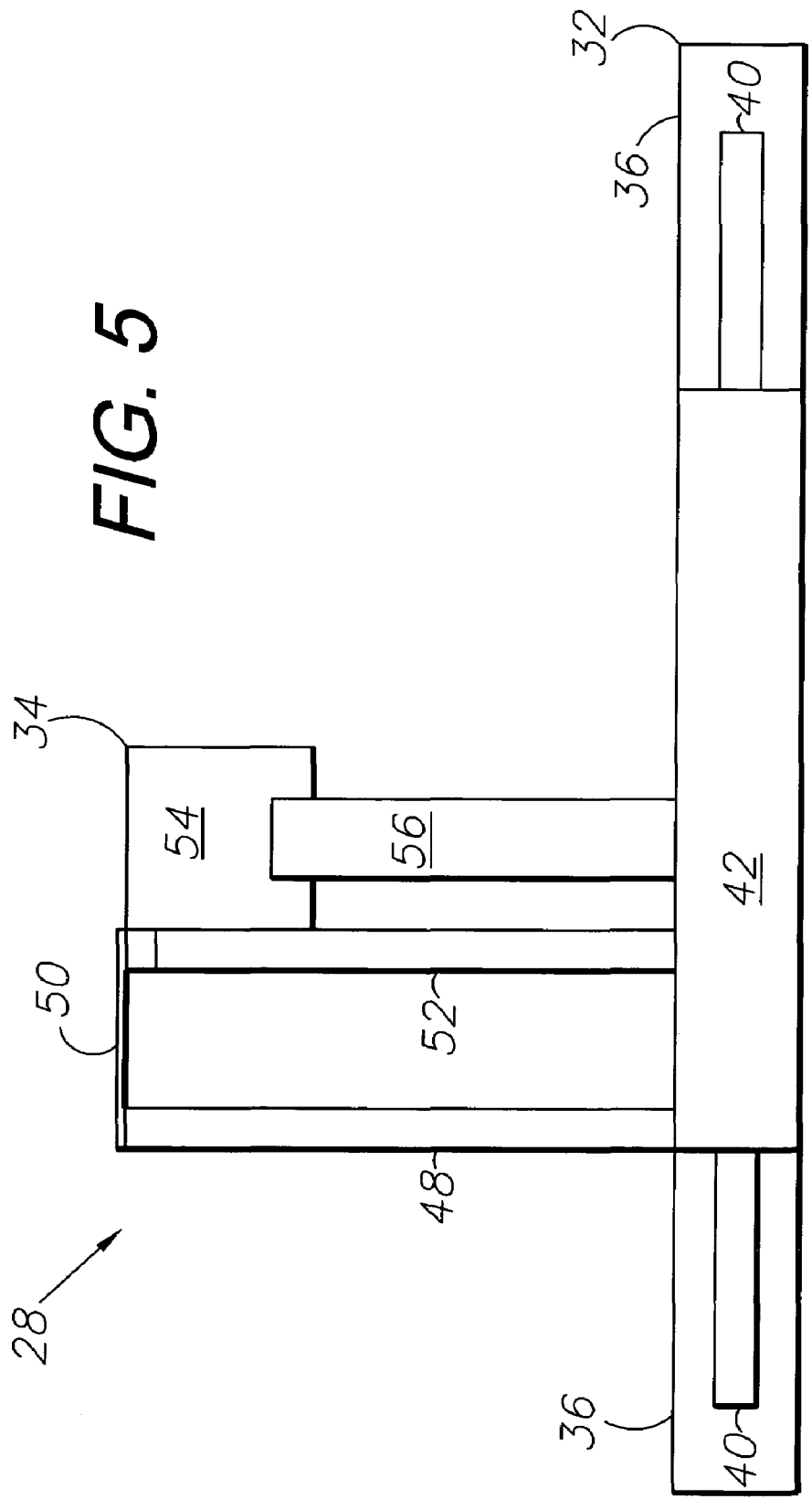
FIG. 5 is a top plan view of the subframe.
Figure 6:
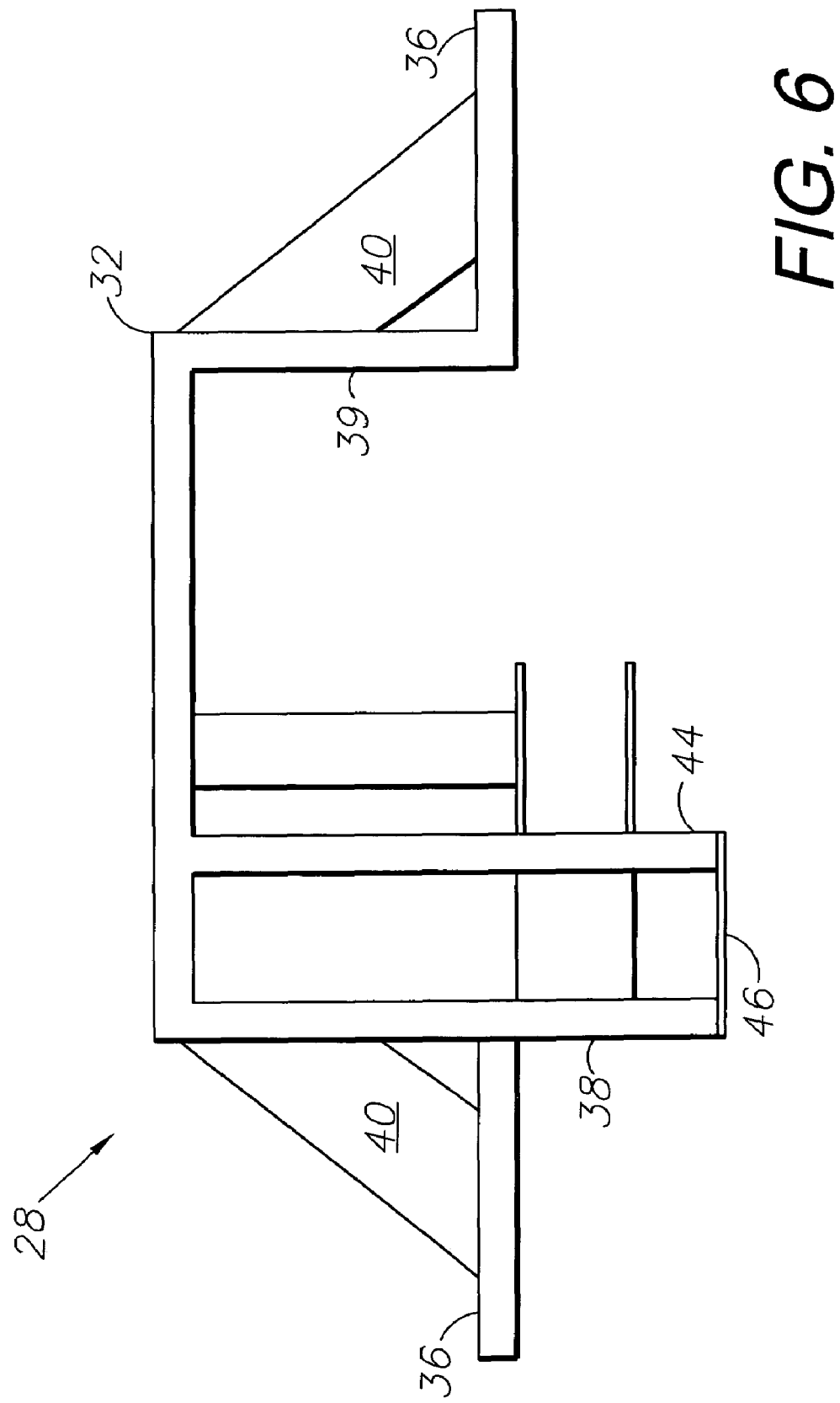
FIG. 6 is a rear elevational view of the subframe.
Figure 7:
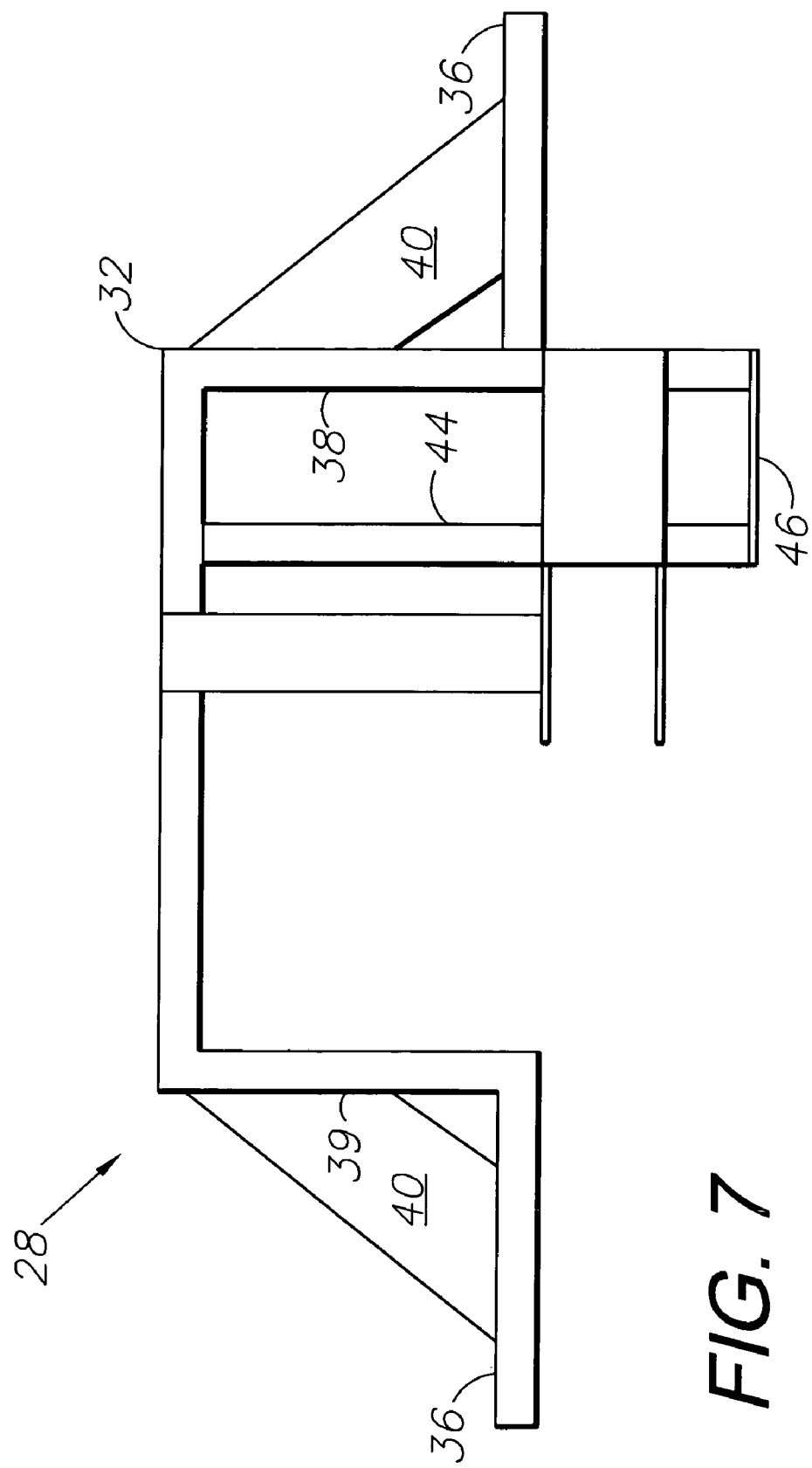
FIG. 7 is a front elevational view of the subframe.
Figure 8:
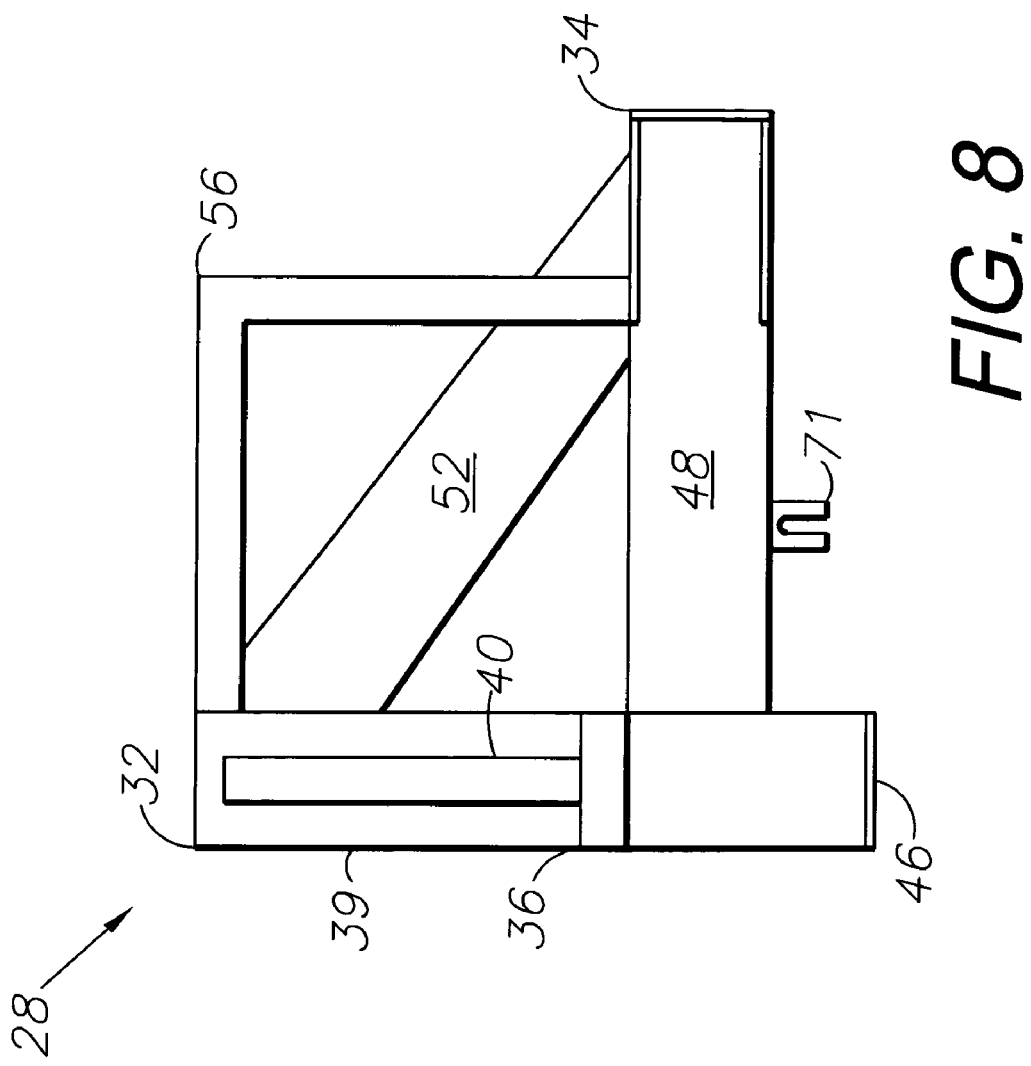
FIG. 8 is a right side elevational view of the subframe.
Figure 9:
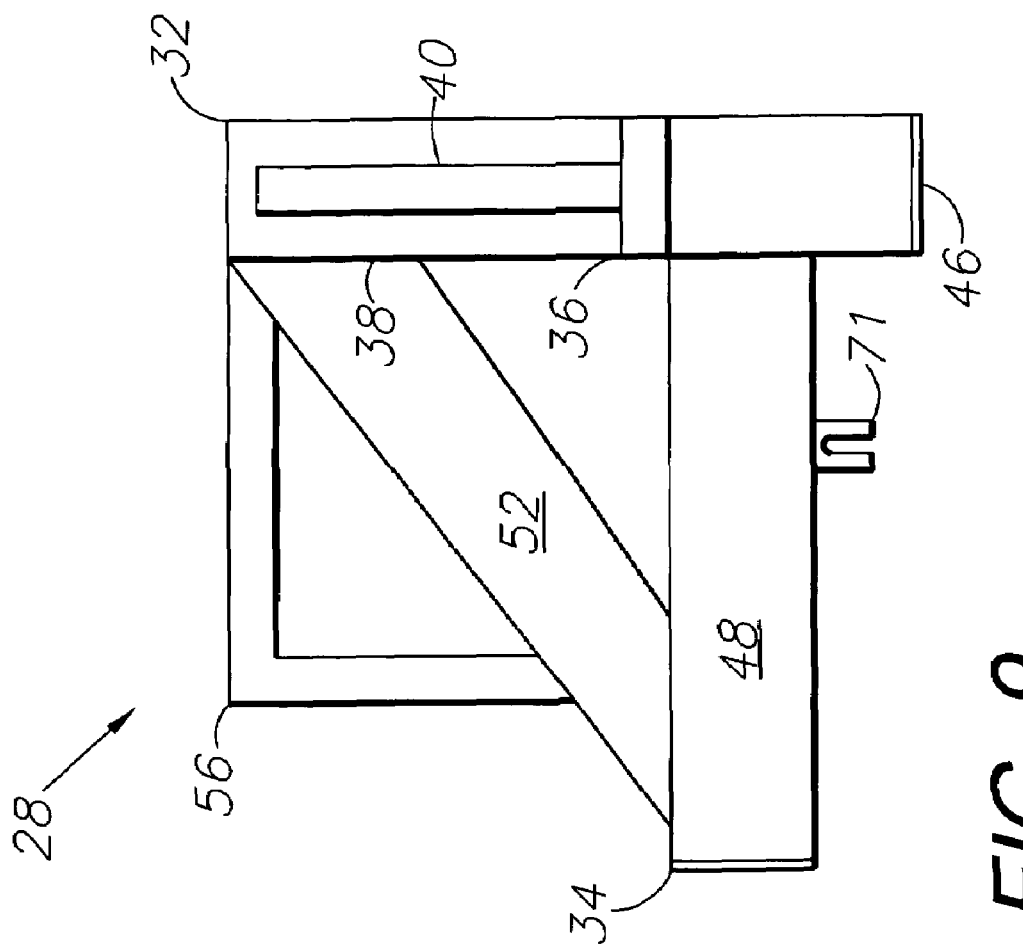
FIG. 9 is a left side elevational view of the subframe.
Figure 10:
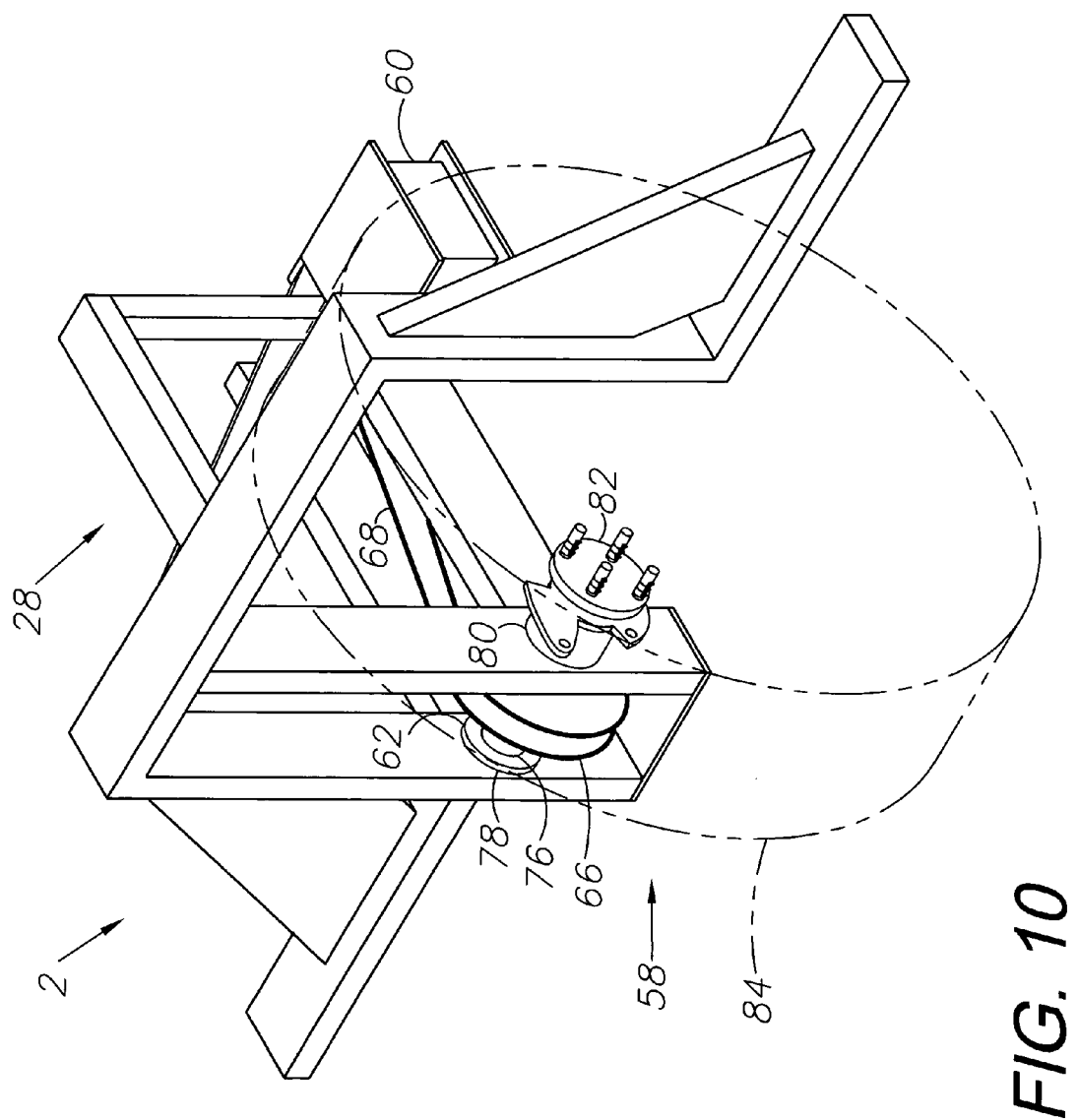
FIG. 10 is an enlarged, upper right rear quarter view of the subframe, shown with modified drivetrain transfer components.
Figure 11:
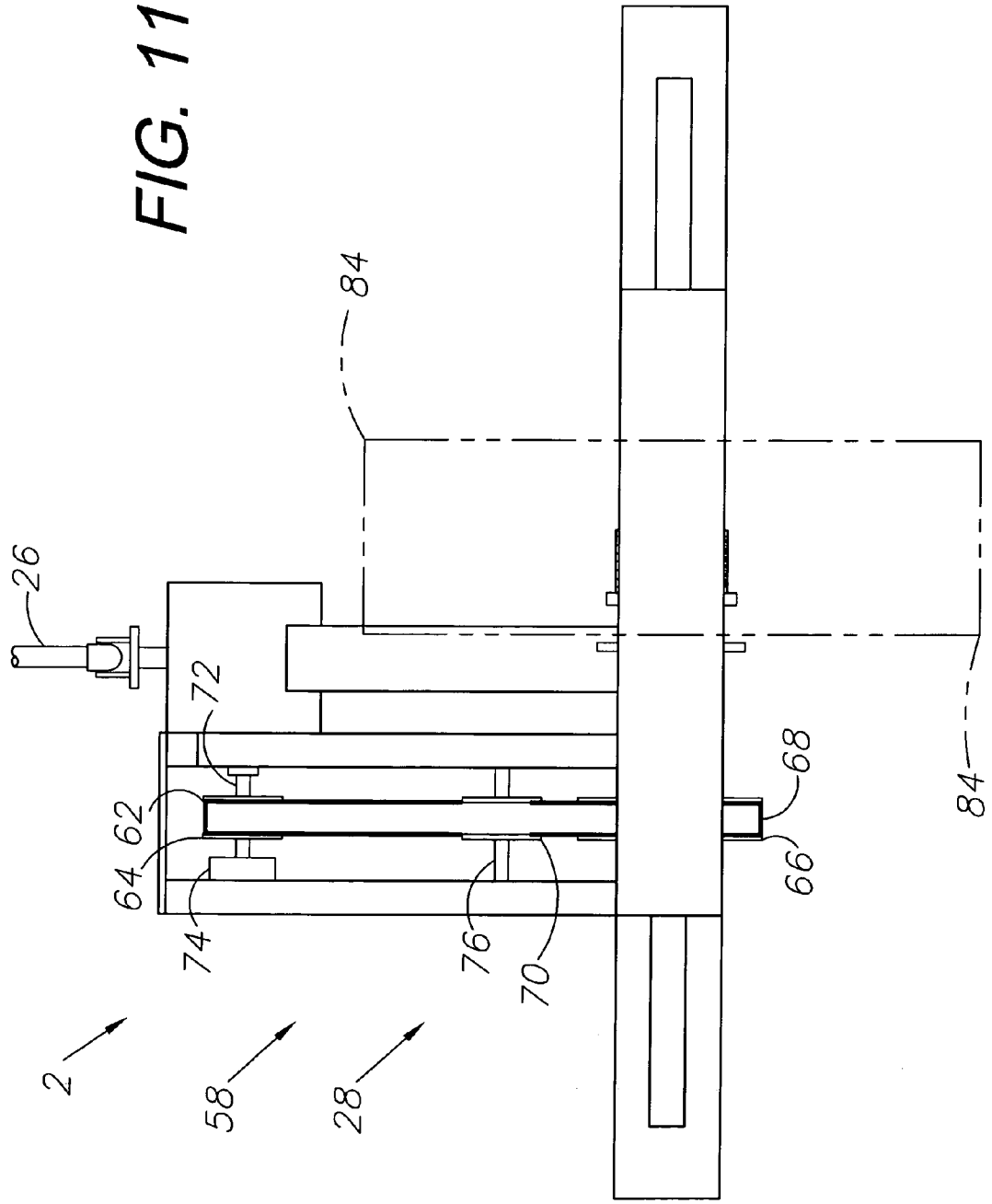
FIG. 11 is a top plan view of the subframe, shown with modified drivetrain transfer components.
Figure 12:
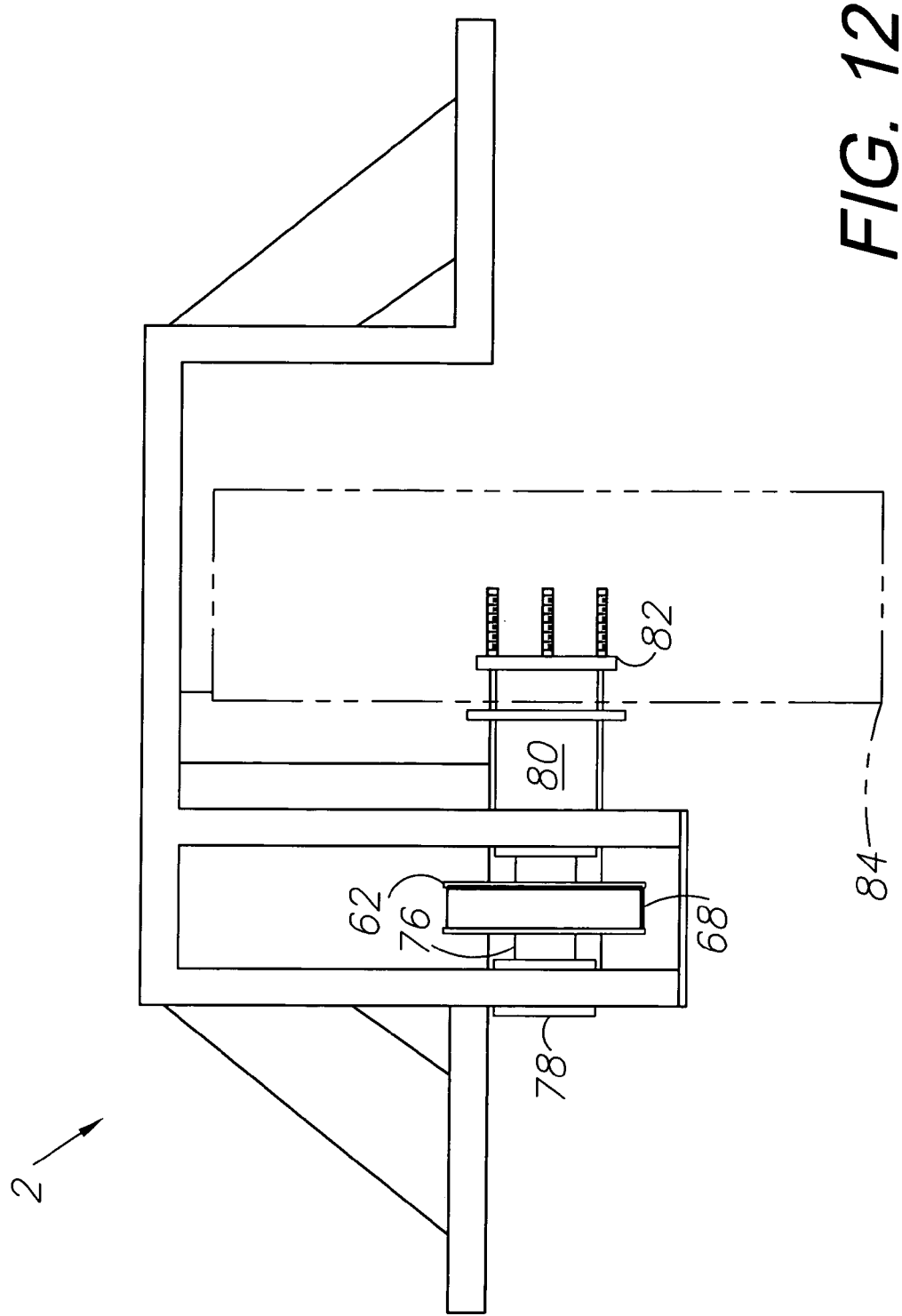
FIG. 12 is a rear elevational view of the subframe, shown with modified drivetrain transfer components.
Figure 13:
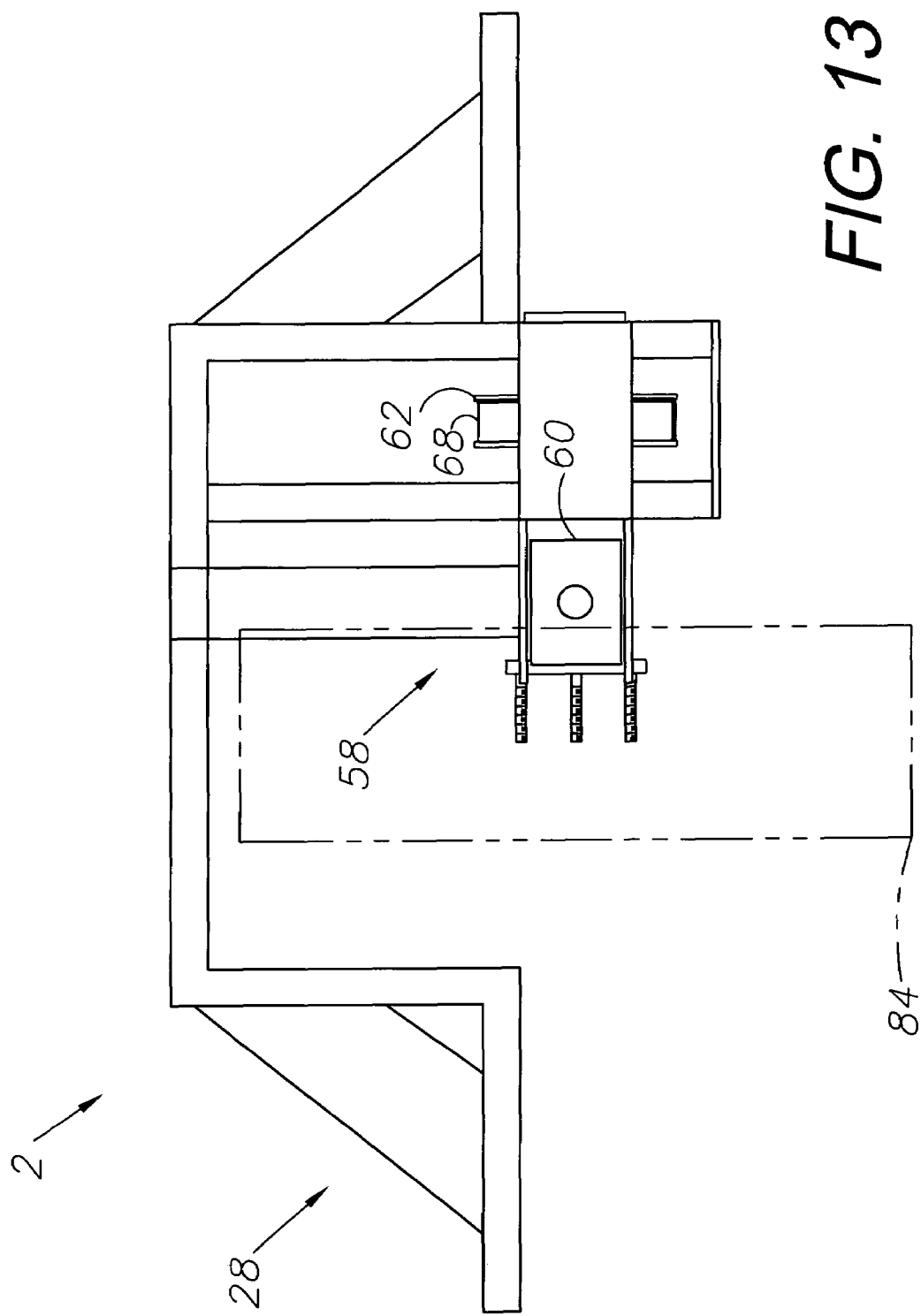
FIG. 13 is a front elevational view of the subframe, shown with modified drivetrain transfer components.
Figure 14:
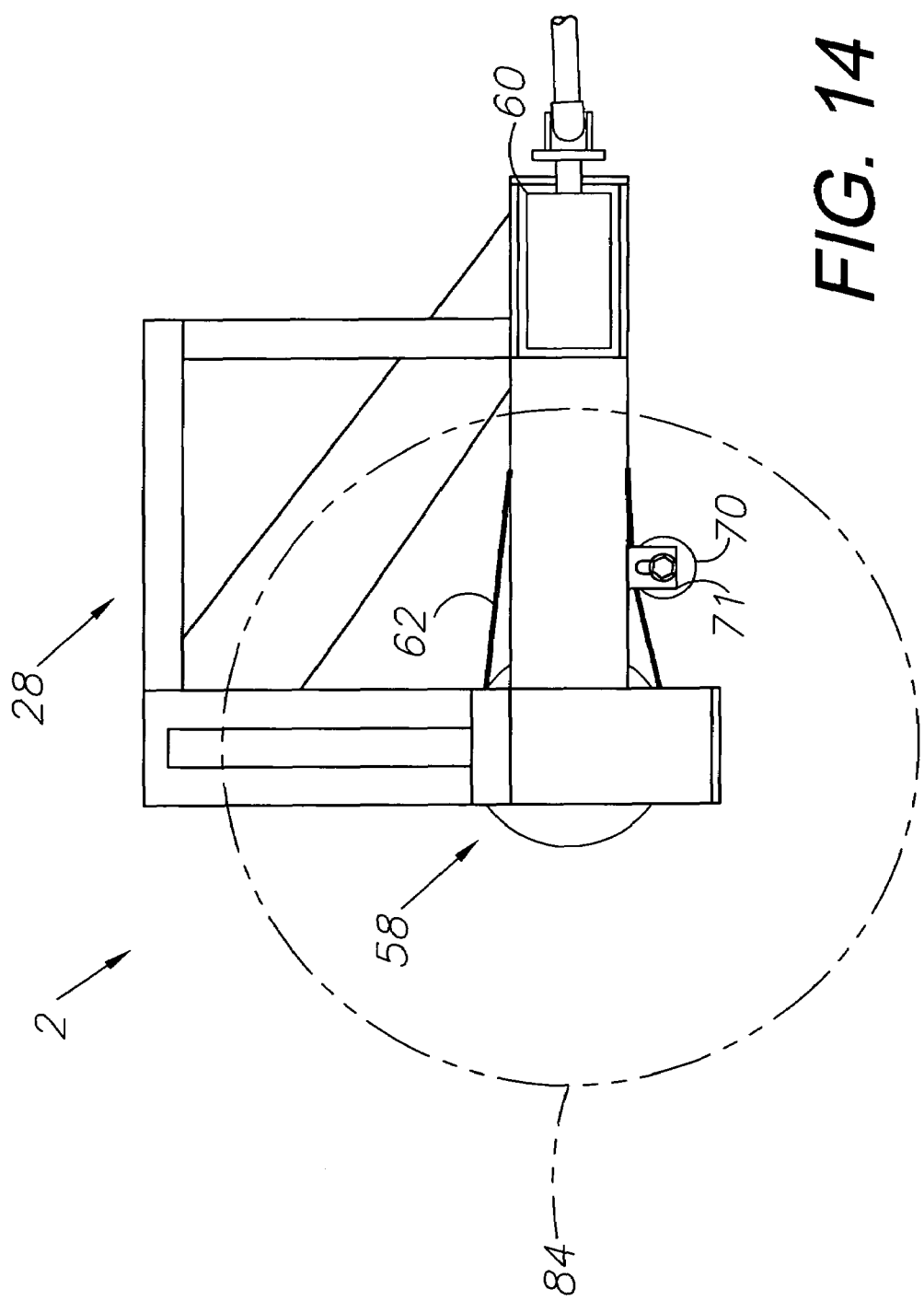
FIG. 14 is a right side elevational view of the subframe, shown with modified drivetrain transfer components.

The subframe 28 generally replaces the rear axle assembly 16 and includes a pair of clamps 30 for attachment to the leaf springs 11 in place of the rear axle assembly 16. The subframe 28 has a generally T-shaped configuration when viewed from above (FIG. 5) with a transverse truss 32, which extends between the leaf springs 11, and a longitudinal truss 34 connected to the transverse truss 32 at a substantially 90 degree right angle. The longitudinal truss 34 extends forwardly from the transverse truss 32. As shown in FIG. 3, the transverse truss 32 includes opposite side legs 36, which are clamped to the leaf springs 11 by the clamps 30. First (left side) and second (right side) columns 38, 39 are mounted on the inboard ends of the side legs 36, and are braced with respect to same by gussets 40. The right (passenger side) column 39 terminates at a respective side leg 36, whereas the left (driver side) column 38 extends downwardly therefrom and is generally parallel to an intermediate or inboard column 44. A bottom plate 46 is attached to the lower ends of the left and intermediate columns 38, 44 and extends therebetween. A crossbar 42 is attached to and extends across the upper ends of the columns 38, 39 and 44.

The longitudinal truss 34 includes a lower pair of horizontal arms 48, which are mounted on the left and intermediate columns 39, 44 slightly below the level of the side legs 36. A front plate 50 is mounted on front ends of the arms 48. The inboard arm 48 is braced against the inboard column 44 by a gusset 52. A pair of gear drive plates 54 are mounted on the inboard arm 48 and project inwardly therefrom in substantially parallel, spaced relation. A gear drive brace 56 with a right-angle configuration is mounted at one end to the crossbar 42 and at its other end to the upper gear drive plate 54.

IV. Transfer 58

Figure 15:
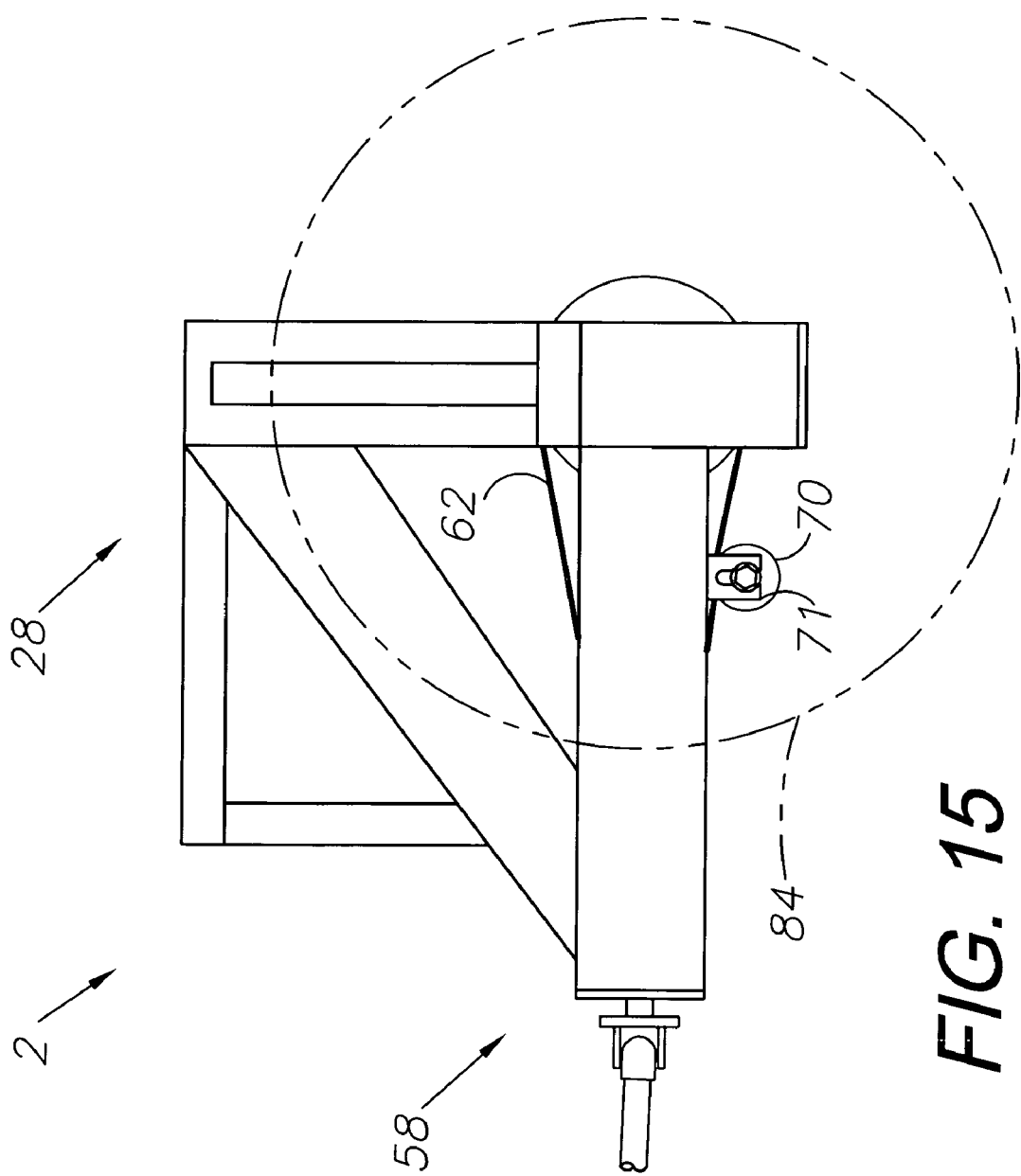
FIG. 15 is a left side elevational view of the subframe, shown with modified drivetrain transfer components.

The original drivetrain 7 is modified with a transfer 58, which is combined with the subframe 28 and generally replaces the original drive shaft 12, the differential 14 and the rear axle assembly 16. The transfer 58 includes the replacement drive shaft 26, which is connected to a right angle gear drive or gearbox 60 mounted on the gear drive plates 54 in a position therebetween and a belt drive subassembly 62, which includes a front pulley 64, a rear pulley 66 and a drive belt 68 drivingly connecting the pulleys 64, 66 in a gear drive space between the first and intermediate columns 38, 44 and between the arms 48. The gear drive 60 is drivingly connected to a front drive axle 72, which extends through the inboard horizontal arm 48, mounts the front pulley 64 and is rotatably received in a front drive axle bearing 74. Without limitation on the generality of useful drive systems, the transfer 58 could alternatively include a chain-and-sprocket drive, additional gears or other suitable components and configurations. An idler pulley 70 is vertically adjustably mounted on brackets 71 depending downwardly from the arms 48 (FIG. 15) and is preferably adjusted to maintain a desired level of tension on the belt 68. A rear drive axle 76 mounts the rear pulley 66 and is journaled in inner and outer bearings 78, 80, which are mounted on the left and intermediate columns 38, 44 respectively. The rear drive axle 76 mounts a rotor 82, which mounts a rear driving wheel 84 in a wheel space between the right and intermediate columns 39,44.

In operation, the rear driving wheel 84 can provide all of the drive propulsion for the vehicle 4. Alternatively, the front wheels can be driven in addition to or in lieu of the rear wheel 84. The rear driving wheel 84 can be equipped with brakes, which can also include a parking or emergency brake. An automatic braking system (ABS) and other conventional brake controls can be installed for maximizing the performance and effectiveness of the brakes. The leaf springs 11 and the shock absorbers function normally in cooperation with the three wheel conversion assembly 2.

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. In combination with a vehicle originally configured with: four wheels; a chassis with a pair of side rails; a drivetrain with a drive shaft, a differential connected to the drive shaft, a pair of rear drive axles connected to the differential and a pair of rear drive wheels each mounted on a respective rear drive axle; a pair of leaf springs each mounted on a respective chassis rail and mounting a respective rear drive axle; the improvement of a three-wheel conversion, which includes:
   a rear suspension subframe including a transverse truss with a pair of legs each mounted on a respective leaf spring and first, second and intermediate columns with upper ends;
   a crossbar connected to and extending transversely across the upper ends of said first, second and intermediate columns and interconnecting same;
   a longitudinal truss extending forwardly from said transverse truss and including a pair of arms;
   a transfer including a gear drive connected to the drive shaft and mounted on said longitudinal truss and a belt drive subassembly connected to said gear drive;
   a rear drive axle mounted on said first and intermediate columns and drivingly connected to said belt drive subassembly; and
   a rear drive wheel mounted on said rear drive wheel axle and located between said intermediate and second columns.

2. The vehicle according to claim 1, which includes:
   said transverse truss side legs being generally horizontally, transversely aligned and extending laterally outwardly from said first and second columns respectively;
   a pair of clamps each clamping a respective transverse truss side leg to a respective leaf spring;

said first and intermediate columns forming a belt drive space therebetween receiving a portion of said belt drive subassembly;

said intermediate and second columns forming a wheel space therebetween receiving said rear drive wheel; and said longitudinal truss arms forming a belt drive space therebetween receiving a portion of said belt drive subassembly.

3. The vehicle according to claim 2, which includes:

said longitudinal truss including a pair of gear drive mounting plates mounted on and extending laterally inwardly from a respective arm; and said gear drive being mounted on said gear drive mounting plates and positioned therebetween.

4. The vehicle according to claim 3, which includes:

said transverse truss including a pair of side gussets each extending from a respective side leg to a respective first or second column;

said longitudinal truss including a longitudinal gusset extending from said intermediate column to a respective said arm; and said longitudinal truss including a right angle gear drive brace connected to and extending from said transverse truss to a respective gear drive mounting plate.

5. The vehicle according to claim 2 wherein said belt drive subassembly includes:

a front pulley mounted in said belt drive space between said longitudinal truss arms;

a rear pulley mounted in said belt drive space between said first and intermediate columns;

a drive belt drivingly connected to said pulleys and generally located within said belt drive space; and an idler pulley vertically adjustably mounted on one of said arms and engaging said drive belt, said idler pulley being adapted for adjusting drive belt tension.

* * * * *